(No Model.)
C. J. BOTTENFIELD.
FARM GATE.
No. 348,148. Patented Aug. 24, 1886.
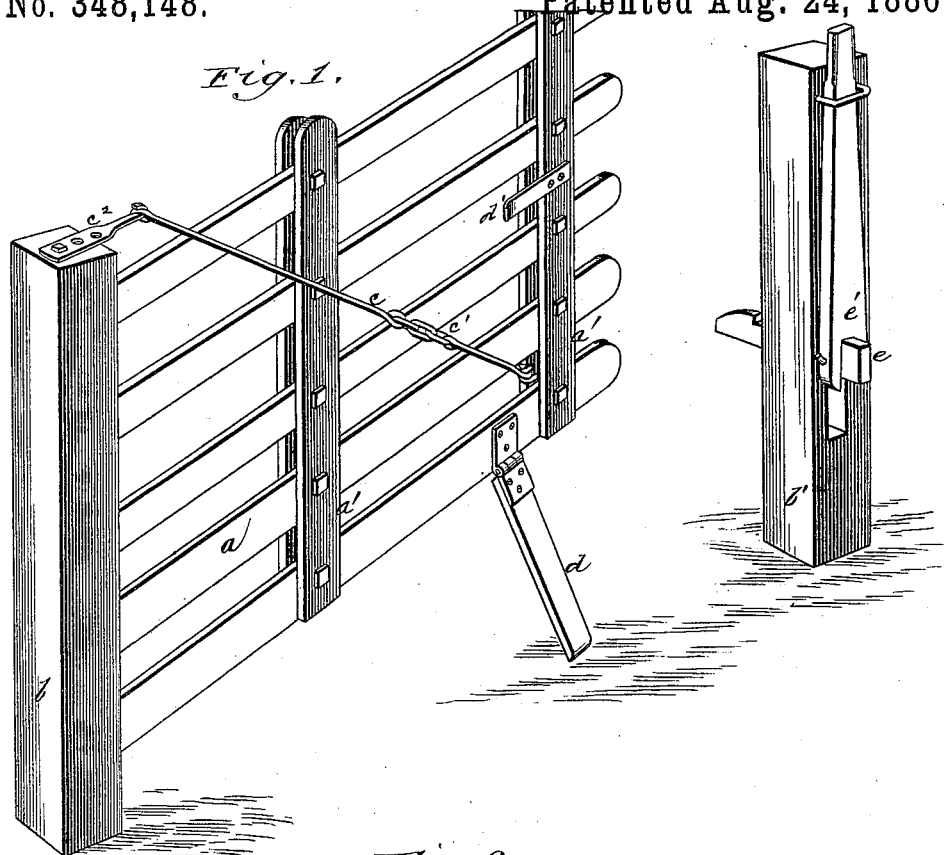
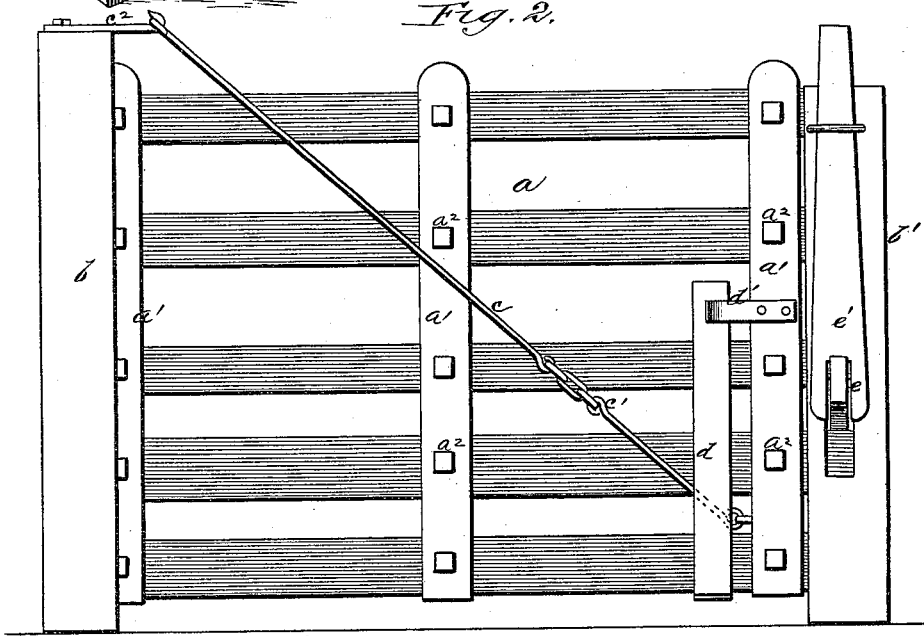
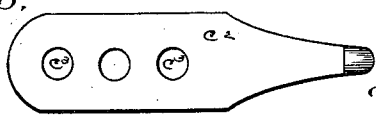
Witnesses.
H. C. McArthur
N. S. McArthur
Inventor:
Carey J. Bottenfield
By H. Harrison
Atty.

UNITED STATES PATENT OFFICE.

CAREY J. BOTTENFIELD, OF PROSPECT, OHIO.

FARM-GATE.

SPECIFICATION forming part of Letters Patent No. 348,148, dated August 24, 1886.

Application filed February 19, 1886. Serial No. 192,550. (No model.)

*To all whom it may concern:*

Be it known that I, CAREY J. BOTTENFIELD, a citizen of the United States, residing at Prospect, in the county of Marion and State of Ohio, have invented certain new and useful Improvements in Farm-Gates, of which the following is a specification, to-wit:

This invention relates to farm-gates; and it consists in the peculiar construction and arrangement of the same, substantially as will be hereinafter more fully set forth and claimed.

In order to enable others skilled in the art to which my invention pertains to make and use the same, I will now proceed to describe its construction and operation, referring to the accompanying drawings, in which—

Figure 1 is a perspective view of my gate partially opened. Fig. 2 is a side elevation of the same; and Fig. 3 is a detail view of the plate on gate-post.

$a$ represents my gate, which is composed of a series of parallel bars united and held in position by two or more uprights, $a'$, to which the horizontal bars are pivoted by single bolts or pivots $a^2$, as in the drawings. The gate-posts $b\ b'$ are planted in the ground in the usual way, and the gate hinged to the post $b$ in any suitable manner. To prevent the free end of the gate from dragging on the ground, I provide a supporting brace-rod, $c$, which is made in two parts, connected by a short section of chain, $c'$, so that it may be lengthened or shortened at pleasure. The lower end of this brace-rod is attached to the lower outer corner of the gate, and its upper end is secured to a plate, $c^2$, pivoted on top of the gate-post, and this plate is formed with a series of holes, $c^3$, so that it may also be adjusted.

To the lower rail of the gate is hinged a brace or bar, $d$, which, when not in use, folds up against the gate, and is held there by a spring-arm, $d'$, which is secured on the upright cross-bar of the gate $a'$. A pivoted latch, $e$, is placed in the outer post, $b'$, and connected to a bar, $e'$, sliding alongside of the post, by which it is operated.

In use the gate swings as usual, and it will be observed that I have hinged the gate at one side or corner of the post, while the pivotal attachment of the brace-rod is about the center of said post, thus causing the lower outer corner of the gate to be lifted as the gate swings open. This lifts the gate off the ground so it cannot drag or strike stones, &c., and also draws the arm $d'$ away from the hinged bar $d$, and allows the latter to drop, as in Fig. 1, acting as a stop to prevent the gate closing till desired, and when the outer end of the gate is lifted it also takes the weight and strain off the brace-rod and post. By shifting the hinged plate or taking up a link of the chain the gate is readily lifted to allow small stock to pass beneath it, while larger stock is confined as usual.

Having thus fully described my invention, what I claim as new, and desire to secure by Letters Patent, is—

The combination in a farm-gate, of the gate $a$, posts $b\ b'$, brace $c$, made in two parts united by a chain-section, the pivot-plate $c^2$, having holes $c^3$, the hinged arm $d$, and its stationary confining-arm $d'$, all constructed and arranged for operation, substantially as and for the purpose set forth.

In testimony whereof I affix my signature in presence of two witnesses.

CAREY J. BOTTENFIELD.

Witnesses:
JOHN A. WOLFORD,
W. L. CLEMENT.